Figure 1:
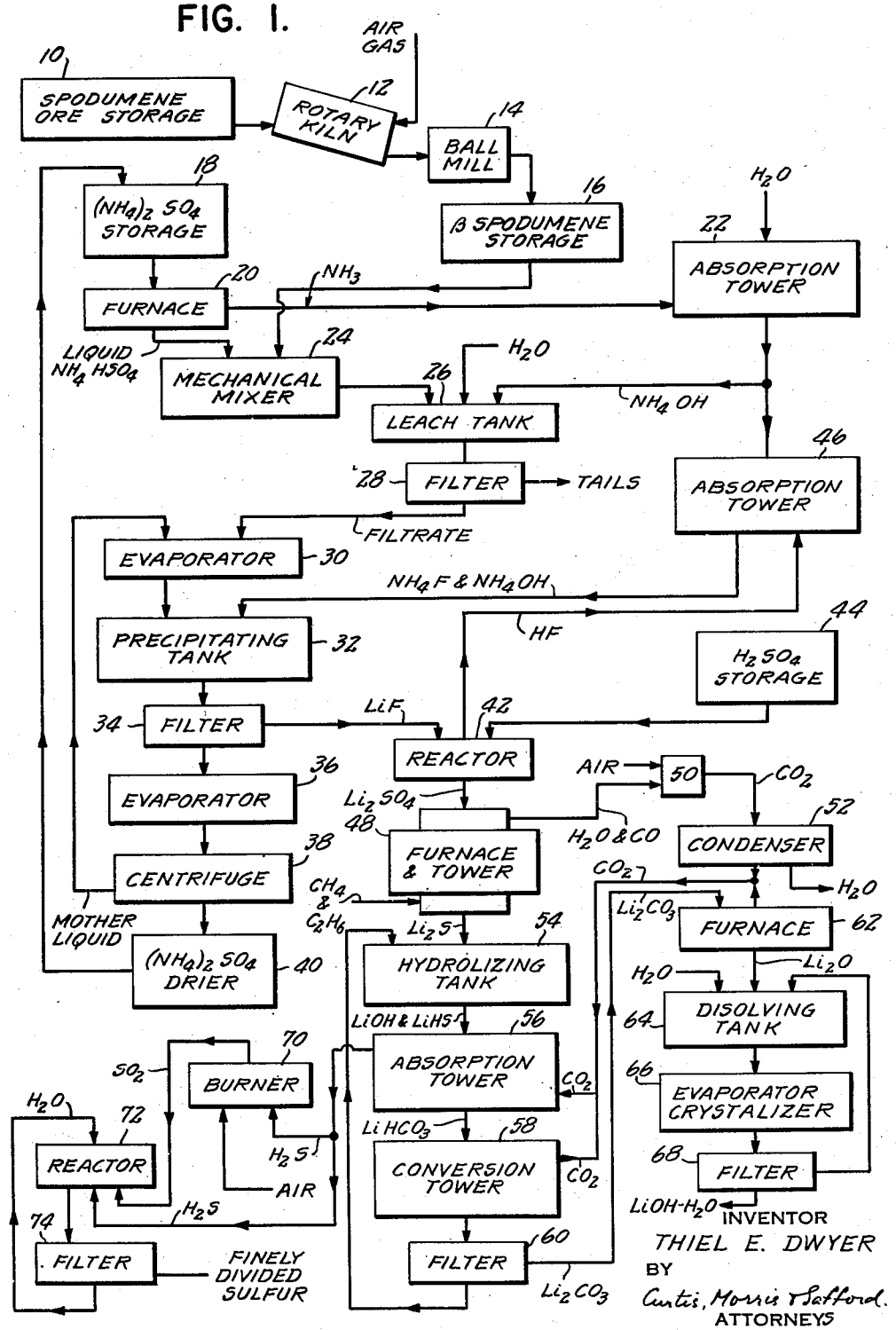

June 24, 1958     T. E. DWYER     2,840,455
PRODUCTION OF LITHIUM CARBONATE

Filed Dec. 2, 1953     2 Sheets-Sheet 1

INVENTOR
THIEL E. DWYER
BY
Curtis, Morris & Safford.
ATTORNEYS

June 24, 1958 — T. E. DWYER — 2,840,455
PRODUCTION OF LITHIUM CARBONATE
Filed Dec. 2, 1953 — 2 Sheets-Sheet 2

INVENTOR
THIEL E. DWYER
BY
Curtis, Morris & Safford
ATTORNEYS

United States Patent Office 2,840,455
Patented June 24, 1958

2,840,455
PRODUCTION OF LITHIUM CARBONATE

Thiel E. Dwyer, Passaic, N. J., assignor to Tholand, Inc., New York, N. Y., a corporation of New York Application December 2, 1953, Serial No. 395,813

15 Claims. (Cl. 23—63)

This invention relates to the extraction of lithium values from spodumene ores and more particularly to a novel and improved method of converting lithium sulphate into lithuim carbonate for use in connection with such an extraction process. This application is a continuation-in-part of my parent application Serial No. 375,590, filed August 21, 1953, now Patent No. 2,801,153.

Although lithium occurs in a wide variety of minerals and ores there are only a relatively few ores that are sufficiently available and contain a sufficient amount of lithium to make them attractive as a commercial source of lithium. Of these commercially practicable sources of lithium, spodumene is the mineral that has in recent years attracted the most interest and various processes for recovering the lithium values from spodumene ores have been proposed. For example, in my parent application referred to above, a process is disclosed wherein the spodumene ore is first roasted to convert the spodumene therein into beta-spodumene and the beta-spodumene is then reacted with an ammonium sulphate to convert the lithium content of the ore into lithium sulphate. The soluble lithium sulphate is leached from the ore with aqueous ammonia and thereafter the lithium sulphate is converted to a carbonate and subsequently, if desired, to lithium hydroxide.

In another previously proposed process spodumene ore which has been roasted to form beta-spodumene is treated with sulfuric acid to convert the lithium content of the ore into a sulphate which is subsequently leached from the ore with water, neutralized to form a lithium sulphate solution, and then converted to a carbonate.

The method ordinarily used for converting lithium sulphate to lithium carbonate prior to the disclosure of my Patent No. 2,801,153 comprised treating the lithium sulphate in aqueous solution with sodium carbonate to precipitate lithium carbonate. However, this method is open to a number of objections, particularly in cases where a relatively pure lithium carbonate is desired. Lithium carbonate is moderately soluble in water and hence in order to effect precipitation of lithium carbonate by treating the sulphate solution with sodium carbonate relatively concentrated solutions must be used. The lithium carbonate thus precipitated tends to carry with it an appreciable proportion of sodium salts. While these sodium salts can be removed by repeated washing, the solubility of the lithium carbonate is such that it dissolves to a considerable extent in the wash-water, and hence the yield of pure lithium carbonate obtained by this method is quite poor. Moreover, sodium carbonate is a relatively expensive reagent.

It is accordingly an object of the present invention to provide a method of converting lithium sulphate into a lithium carbonate of high purity and in an improved yield. It is another object of the invention to provide a process for producing from spodumene ore a lithium carbonate having a low alkali metal content. It is still another object of the invention to provide a method of converting lithium sulphate to lithium carbonate that uses less costly reagents than the processes previously used for this purpose. Other objects of the invention will be in part obvious and in part pointed out hereafter.

In one of its broader aspects the process of the present invention comprises a method of converting lithium sulphate to lithium carbonate which includes the steps of reducing the lithium sulphate to a sulfide, reacting the sulfide in aqueous solution with a carbonating agent which may be either carbon dioxide or lithium bicarbonate to form a lithium carbonate and recovering normal lithium carbonate from the resulting reaction mixture. The preferred procedure for carrying out the method varies somewhat according to whether carbon dioxide or lithium bicarbonate is used as the carbonating agent. In my Patent No. 2,801,153 an embodiment of the present method is disclosed wherein the lithium sulphate is first reduced to a sulfide and then dissolved in water to form a solution of lithium hydroxide and lithium acid sulfide. This aqueous solution is treated in a first tower with carbon dioxide gas to form lithium bicarbonate and the resulting bicarbonate solution is heated in a second tower to drive off carbon dioxide for re-use in the first tower and also to precipitate normal lithium carbonate. The normal carbonate is separated from the bicarbonate liquor by filtration and if desired the bicarbonate liquor can be re-used to dissolve further quantities of the lithium sulfide.

In a second embodiment of the present method described more fully hereafter, the lithium sulfide obtained from the reduction of lithium sulphate is dissolved in aqueous lithium bicarbonate under such conditions as to form lithium acid sulfide and normal lithium carbonate and also under such conditions that a part of the normal lithium carbonate precipitates from the solution. The precipitated normal carbonate is removed by filtration and the filtrate is then treated with carbon dioxide to convert the dissolved lithium acid sulfide and lithium carbonate into lithium bicarbonate. Hydrogen sulfide is evolved during the carbonation operation and the treated solution is recycled to dissolve further quantities of lithium sulfide.

In order to point out more fully the nature of the present invention there is given below a specific example of the method of the invention and its application in practical use as well as a modification thereof. However, it should be understood that these are not intended to be exhaustive or limiting of the invention. On the contrary, these illustrations and explanations herein are given in order to acquaint others skilled in the art with this invention and the principles thereof and a suitable manner of its application in practical use so that others skilled in the art may be enabled to modify the invention and to adapt it and apply it in numerous forms each as may be best suited to the requirements of a particular use. The present specific examples can be most conveniently described by reference to the accompanying drawings which comprise two flow sheets illustrating the manner in which the present invention can be applied in continuous processes for extracting the lithium values from spodumene ores.

Figure 2:
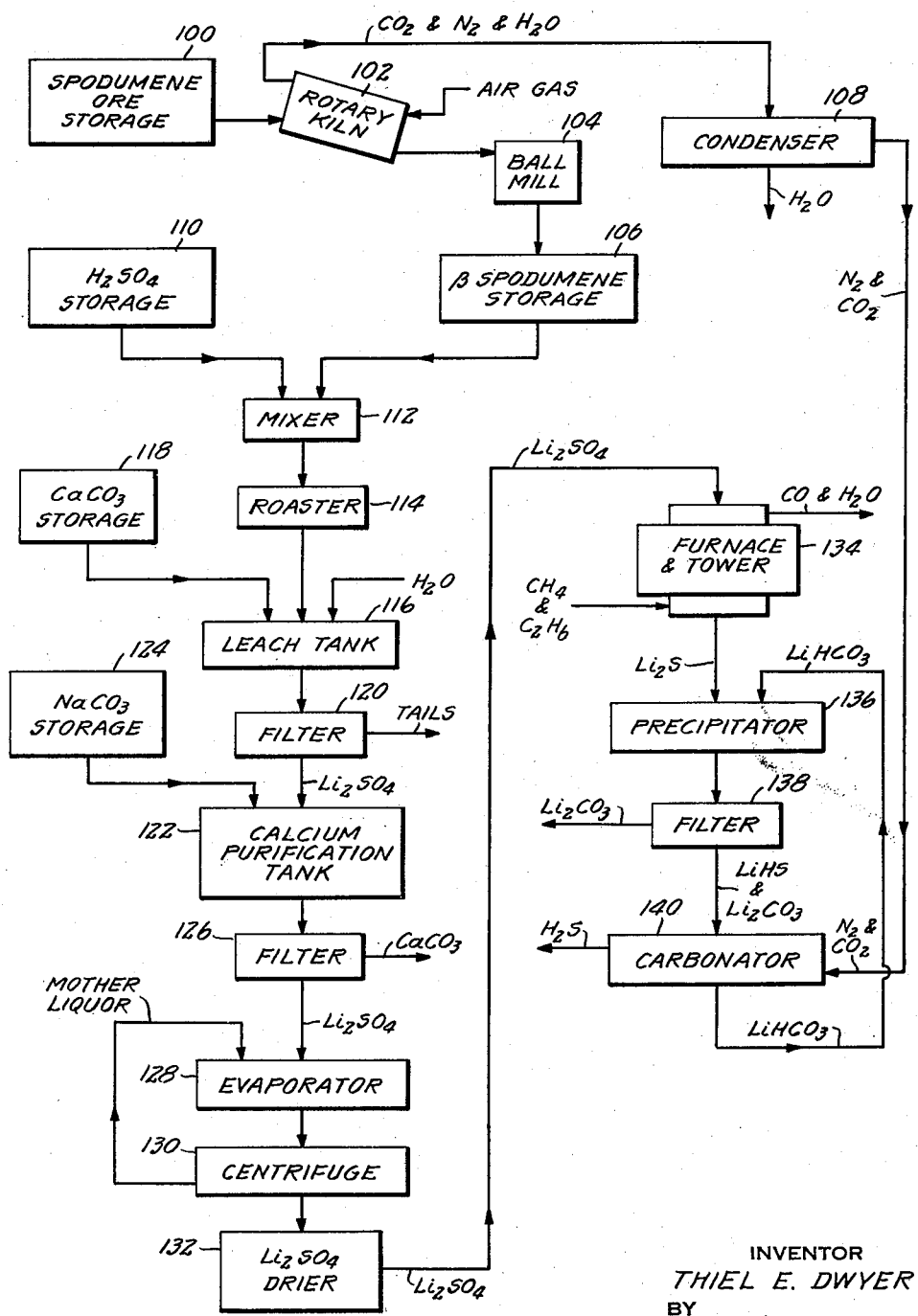

In the drawing, Figure 1 is a flow sheet similar to that filed with my Patent No. 2,801,153 and showing a process wherein the spodumene ore is treated with ammonium sulphate to produce lithium sulphate and the lithium sulphate is then converted to lithium carbonate in accordance with the first embodiment of the present method described above. Figure 2 is a flow sheet illustrating a process wherein the spodumene ore is treated with sulfuric acid to produce lithium sulphate that is then converted to lithium carbonate in accordance with the second embodiment of the present method as described above.

Referring first to Figure 1, in the process there illustrated spodumene ore from a storage tank 10 is fed to a rotary kiln 12 wherein it is heated at a temperature of about 1900° F. to convert the alpha-spodumene to beta-spodumene in accordance with a known procedure. The roasted spodumene then flows to a ball mill 14 wherein it is ground to a particle size such that it passes an 80-mesh sieve, after which it goes to a storage tank 16.

Normal ammonium sulphate from a storage tank 18 is transferred to a furnace 20 wherein it is heated at a temperature of about 550° F. and thereby converted into liquid ammonium acid sulphate and ammonia. The ammonia evolved in furnace 20 flows to the bottom of a tower 22 which may be, for example, a packed tower. Water is fed to the top of tower 22 and flows downwardly therethrough absorbing the upwardly flowing ammonia to form ammonium hydroxide solution that is used in a manner described below.

Approximately equal quantities by weight of ammonium acid sulphate from furnace 20 and ground spodumene from tank 16 are fed to mechanical mixer 24 wherein they are mixed and maintained at a temperature of about 550° F. to cause the acid sulphate to react with the lithium of the ore and convert it into a sulphate. From the mixer 24 the mixture is transferred to a leach tank 26 to which ammonia from tower 22 and water are added in such quantities as to provide about 3 parts by weight of leaching solution per part of the ore mixture to maintain the pH of the leach liquor not less than about 7. The ammoniacal liquor dissolves the lithium sulphate without dissolving iron and aluminum compounds present in the ore.

From leach tank 26 the mixture passes to a filter 28 which operates to separate the leach liquor from the insoluble portions of the ore and the filtrate flows to an evaporator 30. In the evaporator 30 the leach liquor is concentrated by evaporation until the concentration of soluble salts therein is approximately double that in the filtrate from filter 28 and the concentrated liquor then flows to precipitating tank 32 to which an ammonium fluoride solution containing excess ammonia is added. The ammonium fluoride reacts with the lithium sulphate in tank 32 to precipitate lithium fluoride which is separated from the mother liquor in a filter 34. Filtrate from the filter 34 passes to an evaporator 36 wherein it is evaporated to a sufficient extent to cause the ammonium sulphate to crystallize out. The ammonium sulphate crystals are separated from the mother liquor by a centrifuge 38 and the mother liquor is recirculated to the evaporator 30. The ammonium sulphate crystals are dried in a dryer 40 and then returned to the storage tank 18. The recovery of ammonium sulphate is quantitative except for certain small losses that occur in the process and hence the process is essentially cyclic with respect to the ammonium sulphate.

Lithium fluoride from the filter 34 is washed with ammonia to provide a product substantially free from sodium and potassium salts and transferred to a reactor 42 and mixed therein with sulfuric acid from a storage tank 44. The resulting mixture is heated to about 550° F. at which temperature the lithium fluoride is converted to the sulphate and hydrogen fluoride is evolved. The hydrogen fluoride evolved flows to the bottom of a tower 46 which is fed at its top with ammonium hydroxide solution from tower 22. The hydrogen fluoride reacts with the downwardly flowing aqueous ammonia to form ammonium fluoride that is used as the precipitating agent in tank 32.

Lithium sulphate formed in the reactor 42 is transferred to the top of a heated tower 48 that is maintained at a temperature of about 2100° F. At this temperature the lithium sulphate is liquid and readily flows down through the tower. A reducing gas such as hydrogen, methane, ethane or natural gas is fed to the bottom of tower 48 and reacts with the lithium sulphate to reduce it to the sulfide which is also liquid at this temperature. The gases leaving the top of tower 48 comprise water and carbon monoxide and are mixed with air and burned in a chamber 50 to convert the carbon monoxide to carbon dioxide. The gases from the chamber 50 flow to a condenser 52 wherein water is condensed therefrom to provide carbon dioxide gas that is used in the manner described below.

The lithium sulfide from the bottom of tower 48 is transferred to a tank 54 wherein it is dissolved in a spent lithium carbonate liquor, the origin of which is indicated below. In this aqueous liquor the lithium sulfide is hydrolyzed to lithium acid sulfide and lithium hydroxide and the resulting solution flows to the top of a tower 56. Carbon dioxide gas from several different sources including condenser 52 is supplied to the bottom of tower 56 and reacts with the downwardly flowing solution to convert the lithium hydroxide and acid sulfide to lithium bicarbonate which flows to the top of a tower 58. In the tower 58 the lithium bicarbonate solution is heated to a temperature just below its boiling point and thereby converted to the normal carbonate. Since the normal carbonate is less soluble than the acid carbonate a portion of the normal carbonate precipitates and is removed from the solution by filtration in a filter 60. The filtrate is spent lithium carbonate liquor normally containing from 0.5 to 1% lithium carbonate and is returned to tank 54 to dissolve further quantities of lithium sulfide coming from the bottom of tower 48. The carbon dioxide evolved in tower 58 as an incident of the conversion of the lithium acid carbonate to the normal carbonate is fed to the bottom of tower 56 in admixture with the corbon dioxide coming from condenser 52.

The lithium carbonate from filter 60 is transferred to a furnace 62 wherein it is heated to a temperature of 2100° F. and thereby converted into lithium oxide and carbon dioxide gas. The evolved gas is mixed with the carbon dioxide from condenser 52 and flows to the bottom of tower 56.

The lithium oxide from furnace 62 is transferred to a tank 64 wherein it is dissolved in a concentrated lithium hydroxide solution from which it crystallizes as lithium hydroxide monohydrate. The solution from tank 64 flows to an evaporator-crystallizer 66 wherein the solution is concentrated to cause crystals of lithium hydroxide monohydrate to be formed. The resulting slurry is then filtered in a filter 68 and the mother liquor is returned to the tank 64 for use in dissolving further quantities of lithium oxide from furnace 62. The product crystals are highly refined lithium hydroxide monohydrate.

As an incident of the conversion of the lithium acid sulfide to the lithium bicarbonate in tower 56 hydrogen sulfide is formed and removed near the top of tower 56. This hydrogen sulfide can be disposed of in any suitable manner but one method of providing for its satisfactory disposition is indicated in the drawing. Thus the hydrogen sulfide flowing from the top of tower 56 is divided and approximately one-third by volume is burned in air in a chamber 70 to form sulfur dioxide. The remaining hydrogen sulfide and the sulfur dioxide formed in chamber 70 are bubbled through a body of water in a reactor tank 72 and react to precipitate finely divided elemental sulfur which can be removed from the water in a filter 74. The filtrate from filter 74 is returned to tank 72. The elemental sulfur formed in tank 72 is quite finely divided and sometimes difficult to filter. However, it can be rendered readily filterable by addition of calcium hydroxide to the water suspension. The filtered product is either elemental sulfur or a mixture of sulfur and calcium hydroxide. In either case it is a noncorrosive solid that can be readily disposed of.

Referring now to Figure 2 of the drawings, as in the process illustrated in Figure 1, spodumene ore from a storage tank 100 is fed to a rotary kiln 102 wherein it is heated at a temperature of about 1900° F. to convert the alpha-spodumene to beta-spodumene in accordance with a known procedure. The roasted spodumene then flows to a ball mill 104 wherein it is ground to a particle size such that it passes an 80-mesh sieve after which it goes to a storage tank 106. The rotary kiln 102 is heated by a gas flame and a mixture of air and gas is fed to the kiln for this purpose. The products of combustion consisting essentially of carbon dioxide, nitrogen and water pass through a condenser 108 wherein they are cooled and water condensed therefrom. The resulting mixture of nitrogen and carbon dioxide is used as a carbonating agent at a later stage of the process as described below.

Beta-spodumene from storage tank 106 and sulfuric acid from storage tank 108 are mixed in a mixer 112 in the proportions of about 1 part of 60° Bé. acid by weight to 4 parts by weight of the ore and then pass through roaster 114 where the mixture is heated at a temperature of about 550° F. to convert the lithium content thereof into a sulphate. The roasted ore passes to a leach tank 116 to which water is added to dissolve the lithium sulphate from the ore. Also calcium carbonate from a storage tank 118 is added in an amount sufficient to substantially neutralize the acidity of the mixture in the leach tank.

At the end of the leaching operation the mixture in the leach tank is passed through a filter 120 and the filtrate passes to a calcium purification tank 122. The solution at this stage contains not only lithium sulphate but also dissolved calcium sulphate that was formed when the leach liquor was neutralized with calcium carbonate. In the tank 122 this calcium is precipitated by addition of sodium carbonate from a storage tank 124. The precipitated calcium carbonate is removed in a filter 126 and the filtrate passes to an evaporator 128 wherein it is evaporated to precipitate lithium sulphate from the solution. The lithium sulphate crystals are separated in a centrifuge 130 from the mother liquor which is returned to evaporator 128. The separated crystals are dried in a drier 132 and then passed to a furnace and tower 134 similar to the tower and furnace 48 of Figure 1. As previously described in connection with Figure 1, tower 134 is maintained at a temperature of about 2100° F. at which temperature the lithium sulphate is liquid and readily flows down through the tower. A reducing gas is fed to the bottom of tower 134 and reacts with lithium sulphate to reduce it to the sulfide which is also liquid at this temperature. The gases leaving the top of tower 134 comprise water and carbon monoxide and if desired can be burned in air as a source of carbon dioxide as described as in connection with Figure 1.

The lithium sulfide from the bottom of tower 134 is transferred to a precipitator tank 136 wherein it is dissolved in a lithium bicarbonate solution, the origin of which is indicated below. The lithium sulfide reacts with the lithium bicarbonate to form lithium acid sulfide and normal lithium carbonate. The concentration of the incoming lithium bicarbonate solution is such that the major portion of the normal lithium carbonate formed is precipitated. The normal lithium carbonate is separated in a filter 138 and the filtrate which contains the dissolved lithium acid sulfide and some normal lithium carbonate flows to a carbonator 140. A mixture of nitrogen and carbon dioxide from the condenser 108 or carbon dioxide from any other suitable source is fed to the carbonator 140 and caused to flow in intimate contact with the incoming solution. The carbonation with carbon dioxide causes the lithium acid sulfide and normal lithium carbonate to be converted to lithium bicarbonate, and hydrogen sulfide is evolved that can be disposed of in any suitable manner, for example, in the manner described for disposing the hydrogen sulfide leaving the tower 56 in Figure 1. The lithium bicarbonate solution leaving carbonator 140 is returned to the precipitator tank 136 and used to dissolve and react with further quantities of lithium sulfide from tower 134. If desired the normal lithium carbonate removed at filter 138 can be converted to lithium hydroxide or other lithium compounds.

It should be noted that the embodiment of the present method illustrated in Figure 1 is not limited in its utility to lithium sulphate produced by the sulfation procedure of Figure 1, that is to say, the lithium sulfate used as a starting material in the embodiment of Figure 1 can be prepared either by sulfation of the spodumene ore with ammonium sulphate or by sulfation of the spodumene ore with sulfuric acid as illustrated in Figure 2 or in other ways. Similarly the lithium sulphate used as a starting material in the embodiment of Figure 2 can be prepared by sulfation of the spodumene with ammonium sulphate as illustrated in Figure 1 or by sulfation of the ore with sulfuric acid as illustrated in Figure 2 or with lithium sulphate prepared in other ways. The choice as to whether the embodiment of Figure 1 or the embodiment of Figure 2 is used depends in large measure upon the purity of the lithium carbonate product desired. In the embodiment of Figure 1 the sulfur is removed from the solution before the normal lithium carbonate is precipitated and hence this embodiment of the present method produces an exceptional pure lithium carbonate. On the other hand where a lithium carbonate of lesser purity can be tolerated the embodiment of Figure 2 presents certain advantages. In the embodiment of Figure 1 because of the limited solubility of lithium bicarbonate the lithium sulfide must be dissolved in a relatively large volume of water in order to prevent precipitation of lithium bicarbonate in the absorption tower 56. For example, in a typical case 75 parts by weight of recirculated liquor may be used for each part by weight of lithium sulfide. This relatively large volume of solution must then be heated in tower 58 to convert the bicarbonate to the normal carbonate.

In the embodiment of Figure 2 the lithium sulfide reacts with lithium bicarbonate in the precipitator 136 to form normal lithium carbonate and a smaller quantity of water can be used and in fact is desirably used to maximize the proportion of lithium carbonate that is precipitated. For example in a typical case the solution returned to precipitator 136 may contain 5.4% lithium bicarbonate, and the lithium sulfide may be dissolved in 27 parts of this solution as compared with the 75 parts of solution referred to above in connection with the Figure 1 embodiment. It should be further noted that no added heat is required in the Figure 2 embodiment. On the other hand in this embodiment the normal lithium carbonate is precipitated in a sulfide-containing solution and hence carries with it an appreciable amount of sulphur in the form of lithium acid sulfide. The lithium sulfide content of the lithium carbonate can be reduced by washing it with the recirculated lithium bicarbonate solution. However where a pure normal lithium carbonate is important the embodiment of Figure 1 is preferred.

From the foregoing description is should be apparent that the present invention provides a process capable of achieving the several objectives set forth in the present specification. Since the conversion of lithium sulphate to lithium carbonate is effected without addition of an alkali metal carbonate the alkali metal content of the lithium carbonate is exceptionally low. This is particularly true where the process of Figure 1 is used in which the lithium sulphate that has been leached from the ore is precipitated as a fluoride and then reconverted to lithium sulphate with sulfuric acid. On the other hand the conversion of the leached lithium sulphate to lithium fluoride is not an essential step of the present method and a product satisfactory for many purposes can be obtained when this step is omitted.

I claim:

1. The method of producing from spodumene ore refined lithium carbonate substantially free from other al- 1. A method of producing refined lithium carbonate substantially free from other alkali metal carbonates which comprises sulfating the ore to convert the lithium therein to a sulfate, leaching the lithium sulfate from the ore, reducing the extracted lithium sulfate by treating it in the molten state with a wholly gaseous reducing agent to form lithium sulfide, dissolving the lithium sulfide to form an aqueous solution thereof, reacting the lithium sulfide in said solution with a carbonating agent to form a lithium carbonate and recovering normal lithium carbonate from the reaction mixture.

2. The method of producing from spodumene ore refined lithium carbonate substantially free from other alkali metal carbonates which comprises sulfating the ore to convert the lithium therein to a sulfate, leaching the lithium sulfate from the ore, reducing the extracted lithium sulfate by treating it in the molten state with a wholly gaseous reducing agent to form lithium sulfide, dissolving the lithium sulfide to form an aqueous solution thereof, reacting the lithium sulfide in said solution with carbon dioxide to form lithium bicarbonate, heating the resulting lithium bicarbonate solution to precipitate normal lithium carbonate and recovering the normal carbonate from the reaction mixture.

3. A method according to claim 2 and wherein the liquor from which the normal carbonate is recovered is utilized to dissolve the lithium sulfide for carbonation.

4. The method of producing from spodumene ore refined lithium carbonate substantially free from other alkali metal carbonates which comprises sulfating the ore to convert lithium therein to a sulfate, leaching the lithium sulfate from the ore, reducing the extracted lithium sulfate by treating it in the molten state with a wholly gaseous reducing agent to form lithium sulfide, dissolving the lithium sulfide to form an aqueous solution thereof, reacting the lithium sulfide in said solution with aqueous lithium bicarbonate to precipitate normal lithium carbonate and separating the normal carbonate from the bicarbonate liquor.

5. A method according to claim 4 and wherein the bicarbonate liquor from which the normal carbonate is separated is treated with carbon dioxide gas to remove sulfur therefrom in the form of hydrogen sulfide and is then recycled as the dissolving medium for the lithium sulfide.

6. A method of producing from spodumene ore refined lithium carbonate substantially free from other alkali metal carbonates which comprises treating the ore with an ammonium sulfate to convert the lithium therein to a sulfate, extracting the ore with an aqueous leaching agent to dissolve lithium sulfate and ammonium sulfate therefrom, treating the resulting leach liquor with ammonium-fluoride to precipitate lithium fluoride, sulfating the precipitated lithium fluoride to form lithium sulfate, reducing the lithium sulfate by treating it in the molten state with a wholly gaseous reducing agent to form lithium sulfide, dissolving the lithium sulfide to form an aqueous solution thereof, reacting the lithium sulfide in said solution with a carbonating agent to form a lithium carbonate and recovering lithium carbonate from the reaction mixture.

7. The method of producing from spodumene ore refined lithium carbonate substantially free from other alkali metal carbonates which comprises treating the ore with an ammonium sulfate to convert the lithium therein to a sulfate, extracting the ore with an aqueous leaching agent to dissolve lithium sulfate and ammonium sulfate therefrom, treating the resulting solution with ammonium fluoride to precipitate lithium fluoride, sulfating the lithium fluoride to form lithium sulfate, reducing the lithium sulfate by treating it in the molten state with a wholly gaseous reducing agent to form lithium sulfide, dissolving the lithium sulfide to form an aqueous solution thereof, reacting the lithium sulfide in said solution with carbon dioxide to form lithium bicarbonate, heating the resulting lithium bicarbonate solution to precipitate normal lithium carbonate and recovering the normal lithium carbonate from the reaction mixture.

8. The method of producing from spodumene ore refined lithium carbonate substantially free from other alkali metal carbonates which comprises treating the ore with an ammonium sulphate to convert the lithium therein to a sulfate, extracting the ore with an aqueous leaching agent to dissolve lithium sulfate and ammonium sulfate therefrom, treating the resulting solution with ammonium fluoride to precipitate lithium fluoride, sulfating the precipitated lithium fluoride to form lithium sulfate, reducing the lithium sulfate by treating it in the molten state with a wholly gaseous reducing agent to form lithium sulfide, dissolving the lithium sulfide to form an aqueous solution thereof, reacting the lithium sulfide in said solution with aqueous lithium bicarbonate to precipitate normal lithium carbonate and separating the normal carbonate from the bicarbonate liquor.

9. In the recovery of lithium values from lithium-bearing ores, the method of converting lithium sulfate to lithium carbonate substantially free from other alkali metal carbonates which comprises, reducing the lithium sulfate by treating it in the molten state with a wholly gaseous reducing agent to form lithium sulfide, dissolving the lithium sulfide to form an aqueous solution thereof, reacting the lithium sulfide in said solution with a carbonating agent to form a lithium carbonate, and recovering normal lithium carbonate from the reaction mixture.

10. In the recovery of lithium values from lithium-bearing ores, the method of converting lithium sulfate to lithium carbonate substantially free from other alkali metal carbonates which comprises, reducing the lithium sulfate by treating it in the molten state with a wholly gaseous reducing agent to form lithium sulfide, dissolving the lithium sulfide to form an aqueous solution thereof, reacting the lithium sulfide in said solution with carbon dioxide to form lithium bicarbonate, heating the resulting lithium bicarbonate solution to precipitate normal lithium carbonate therefrom and recovering the normal carbonate from the reaction mixture.

11. In the recovery of lithium values from lithium-bearing ores, the method of converting lithium sulfate to lithium carbonate substantially free from other alkali metal carbonates which comprises, reducing the lithium sulfate by treating it in the molten state with a wholly gaseous reducing agent to form lithium sulfide, dissolving the lithium sulfide to form an aqueous solution thereof, reacting the lithium sulfide in said solution with aqueous lithium bicarbonate to precipitate normal lithium carbonate, and separating the normal carbonate from the bicarbonate liquor.

12. A method of producing refined lithium carbonate substantially free from other alkali metal carbonates which comprises the following steps: (1) sulfating spodumene ore with an ammonium sulfate to convert the lithium content thereof to a sulfate, (2) extracting the sulfated ore with an aqueous ammoniacal leaching agent to dissolve lithium sulfate and ammonium sulfate therefrom, (3) treating the leach liquor with ammonium fluoride to precipitate lithium fluoride, (4) separating the precipitated lithium fluoride and heating it with sulfuric acid to form lithium sulfate and evolve hydrogen fluoride, (5) reducing the lithium sulfate by treating it in the molten state with a wholly gaseous reducing agent to form lithium sulfide, (6) dissolving the lithium sulfide to form an aqueous solution thereof and reacting the lithium sulfide in said aqueous solution with carbon dioxide to form lithium bicarbonate, (7) heating the bicarbonate solution to precipitate normal lithium carbonate therefrom, and (8) recovering the normal carbonate from the bicarbonate liquor.

13. A method according to claim 12 and wherein the bicarbonate liquor from step 8 is used to dissolve the lithium sulfide in step 6.

14. A method of producing refined lithium carbonate substantially free from other alkali metal carbonates which comprises the following steps: (1) sulfating spodumene ore with an ammonium sulfate to convert the lithium therein into a sulfate, (2) extracting the sulfated ore with an aqueous ammoniacal leaching agent to dissolve lithium sulfate and ammonium sulfate therefrom, (3) treating the leach liquor with ammonium fluoride to precipitate lithium fluoride, (4) separating the precipitated lithium fluoride and heating it with sulfuric acid to form lithium sulfate and evolve hydrogen fluoride, (5) reducing the lithium sulfate by treating it in the molten state with a wholly gaseous reducing agent to form lithium sulfide, (6) dissolving the lithium sulfide to form an aqueous solution thereof and reacting the lithium sulfide in said aqueous solution with aqueous lithium bicarbonate to precipitate normal lithium carbonate from the bicarbonate liquor, and (7) separating the normal lithium carbonate from the bicarbonate liquor.

15. A method according to claim 14 and wherein the bicarbonate liquor from step 7 is used in dissolving the lithium sulfide in step 6.

References Cited in the file of this patent

UNITED STATES PATENTS

| | | |
|---|---|---|
| 876,851 | Wadman | Jan. 14, 1908 |
| 951,243 | Hasenbach | Mar. 8, 1910 |
| 1,141,639 | Hirt | June 1, 1915 |
| 1,430,877 | Bailey et al. | Oct. 3, 1922 |
| 1,515,001 | Girsewald et al. | Nov. 11, 1924 |
| 2,516,109 | Ellestad et al. | July 25, 1950 |
| 2,675,297 | Gray et al. | Apr. 13, 1954 |

FOREIGN PATENTS

| | | |
|---|---|---|
| 10,900 | Great Britain | 1887 |
| 392,765 | Great Britain | May 25, 1933 |

OTHER REFERENCES

Jones, Jr.: "Inorganic Chemistry," page 479, published 1947, The Blakiston Company (Philadelphia).

Mellor: "Comprehensive Treatise on Inorganic and Theoretical Chemistry," vol. 2, page 672, Longmans, Green & Co. (New York), 1922.